(12) United States Patent
Araki et al.

(10) Patent No.: US 8,295,281 B2
(45) Date of Patent: Oct. 23, 2012

(54) COMMUNICATION SYSTEM, COMMUNICATION TERMINAL DEVICE USED IN COMMUNICATION SYSTEM AND COMMUNICATION METHOD USED IN COMMUNICATION SYSTEM

(75) Inventors: Motohisa Araki, Akishima (JP); Shuichi Sato, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1853 days.

(21) Appl. No.: 11/170,023

(22) Filed: Jun. 29, 2005

(65) Prior Publication Data
US 2006/0002395 A1 Jan. 5, 2006

(30) Foreign Application Priority Data
Jun. 30, 2004 (JP) ................. 2004-194701

(51) Int. Cl.
H04L 12/28 (2006.01)
(52) U.S. Cl. ......... 370/392; 370/252; 370/401; 370/465
(58) Field of Classification Search .......... None
See application file for complete search history.

(56) References Cited

U.S. PATENT DOCUMENTS

| | | | | |
|---|---|---|---|---|
| 6,928,082 | B2* | 8/2005 | Liu et al. .............. | 370/401 |
| 7,193,996 | B2* | 3/2007 | Dobbins et al. .......... | 370/392 |
| 7,333,500 | B2* | 2/2008 | Roshko ................. | 370/401 |
| 2003/0185207 | A1 | 10/2003 | Nakahara | |
| 2004/0054810 | A1* | 3/2004 | Furukawa et al. ........ | 709/249 |
| 2004/0252683 | A1* | 12/2004 | Kennedy et al. ........ | 370/389 |
| 2005/0117605 | A1* | 6/2005 | Yan et al. .............. | 370/469 |

FOREIGN PATENT DOCUMENTS

| | | |
|---|---|---|
| JP | H06-029989 A | 2/1994 |
| JP | 2003-289318 | 10/2002 |
| JP | 2002-368773 | 12/2002 |
| JP | 2003-087335 A | 3/2003 |
| JP | 2003-324482 | 11/2003 |

* cited by examiner

Primary Examiner — Michael J Moore, Jr.
(74) Attorney, Agent, or Firm — Knobbe, Martens, Olson & Bear, LLP

(57) ABSTRACT

A communication system includes a first communication terminal connected to an internal communication network, a second communication terminal connected to an external communication network arranged in an area, and a connection device which connects the internal communication network and external communication network to each other, wherein the second communication terminal includes means for storing first transmission-destination identifying information included in the data area of a communication packet transmitted from the first communication terminal, means for comparing the first transmission-destination identifying information and second transmission-destination identifying information included in the header area of a communication packet, means for adding the second transmission-destination identifying information to the communication packet to be transmitted to the first communication terminal when the first transmission-destination identifying information and the second transmission-destination identifying information do not coincide with each other.

14 Claims, 5 Drawing Sheets

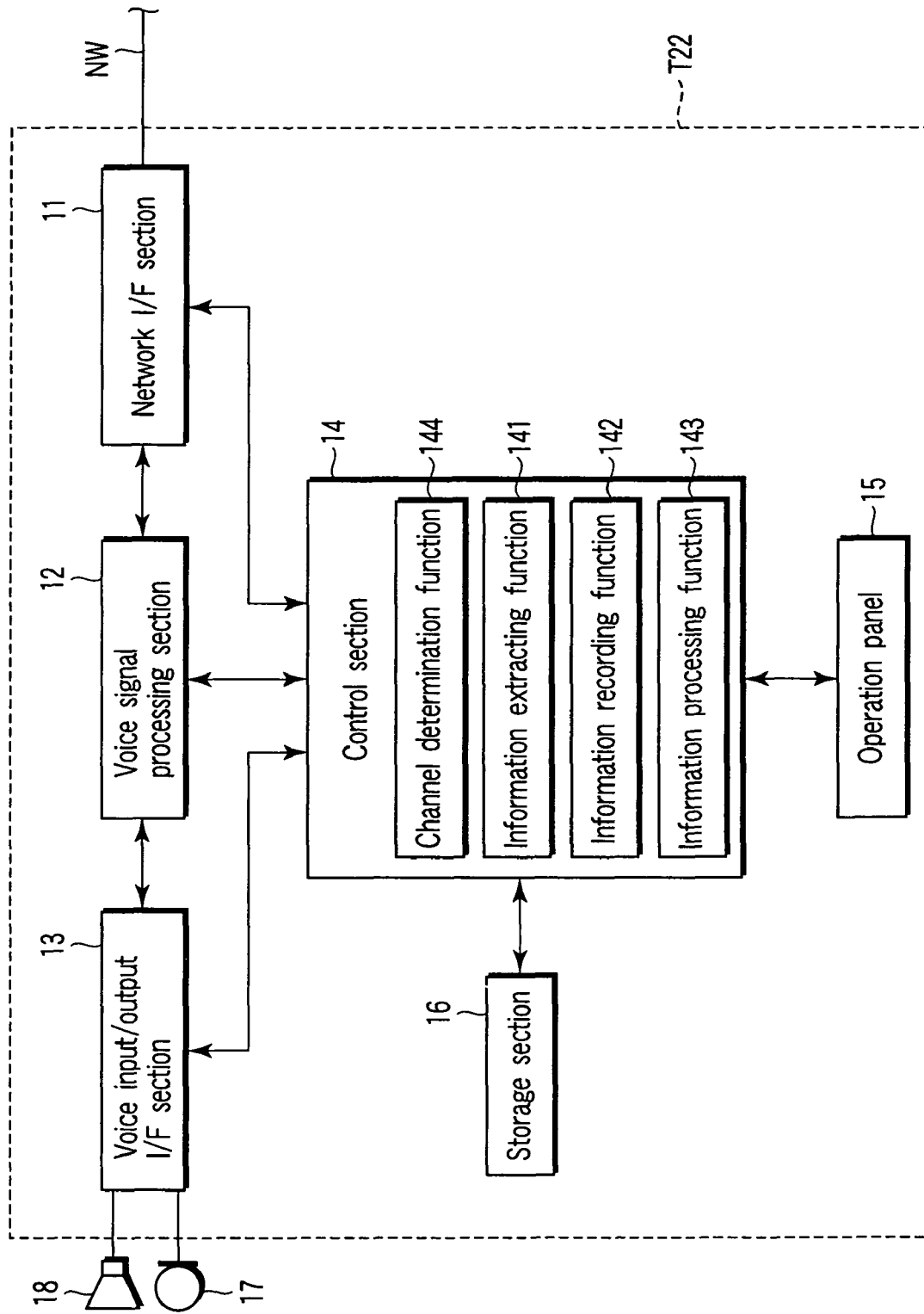
F I G. 7

COMMUNICATION SYSTEM, COMMUNICATION TERMINAL DEVICE USED IN COMMUNICATION SYSTEM AND COMMUNICATION METHOD USED IN COMMUNICATION SYSTEM

CROSS-REFERENCE TO RELATED APPLICATIONS

This application is based upon and claims the benefit of priority from the prior Japanese Patent Application No. 2004-194701, filed Jun. 30, 2004, the entire contents of which are incorporated herein by reference.

BACKGROUND OF THE INVENTION

1. Field of the Invention

This invention relates to a system such as an Internet Protocol (IP) telephone system which performs voice communication between telephone terminals via an IP network and more particularly to a communication system which performs communication between a telephone terminal connected to a global network and a telephone terminal connected to a private network, and a communication terminal device used in the communication system and a communication method used in the communication system.

2. Description of the Related Art

Recently, a network telephone system (IP telephone system) which bi-directionally transmits/receives images and voice as packet data on a real-time basis via a packet network has been adopted. In the IP telephone system, a plurality of IP telephone terminals are provided in a private network such as a LAN (Local Area Network) and the private network is connected to a global network such as a public communication network via a router device. Thus, multimedia information communication can be performed between the IP telephone terminals and between the JP telephone terminal and the global network by performing protocol conversion, address conversion and the like in the router device.

In the above system, a Network Address Translator (NAT) function is provided on the router device. The NAT function is a function of converting a private address into a global address and transmitting the same as a transmission-source IP address by use of one IP address previously assigned for connection, and converting a global address of a destination IP address supplied in the reception mode into a private address. The NAT function is specified by RFC (Request For Comments) 1631 (for example, refer to Japanese Patent Application KOKAI Publication No. 2003-289318, Japanese Patent Application KOKAI Publication No. 2002-368773 and Japanese Patent Application KOKAI Publication No. 2003-324482).

In the above system, address conversion is performed on an IP address and a port number included in a header area of an IP packet in a router device in communication in which a media channel different from the control channel is newly opened at the time of communication. However, address conversion is not performed by the router device on an IP address and a port number included in a data area of the IP packet. Therefore, even if an attempt is made to answer voice data to a transmission-source of the IP packet by use of an IP address and a port number included in the data area of the IP packet by a terminal which receives the IP packet, the destination cannot be correctly specified, when a terminal on the private network communicates with a terminal on the global network via a router that provides the NAT function.

BRIEF SUMMARY OF THE INVENTION

Accordingly, an object of this invention is to provide a communication system which can stably perform communication between different packet communication networks without being influenced by a function of a connecting device which makes a connection between the different packet communication networks, a communication terminal device used in the communication system and a communication method used in the communication system.

According to an aspect of the present invention, there is provided a communication system comprising: a first communication terminal connected to an internal communication network having a communication channel used for transmission of a communication packet comprising a header area and a data area; a second communication terminal connected to an external communication network having the communication channel and arranged in an area which is larger than the internal communication network; and a connection device which connects the internal communication network and external communication network to each other; wherein the second communication terminal includes storing means for storing a first transmission-destination identifying information included in the data area of a communication packet transmitted from the first communication terminal, the first transmission-destination identifying information used in communication of the communication packet, when the communication channel to connect the first communication terminal and the second communication terminal is determined; comparing means for comparing the first transmission-destination identifying information and a second transmission-destination identifying information included in the header area of communication packet, the second transmission-destination identifying information which is used to identify the first communication terminal, when the communication packet is input via the external communication network; processing means for adding the first transmission-destination identifying information to communication packet to be transmitted to the first communication terminal, when the first transmission-destination identifying information and the second transmission-destination identifying information coincide with each other, and adding the second transmission-destination identifying information to the communication packet, when the first transmission-destination identifying information and the second transmission-destination identifying information do not coincide with each other.

According to another aspect of the present invention, there is provided a communication terminal device used as a second communication terminal of a communication system which includes a first communication terminal connected to an internal communication network having a communication channel used for transmission of a communication packet comprising a header area and a data area, the second communication terminal connected to an external communication network having the communication channel and arranged in an area which is larger than the internal communication network, and a connection device which connects the internal communication network and external communication network to each other, comprising: storing means for storing a first transmission-destination identifying information included in the data area of a communication packet transmitted from the first communication terminal, the first transmission-destination identifying information used in communication of the communication packet, when the communication channel to connect the first communication terminal and the second communication terminal is determined; comparing means for comparing the first transmission-destination identifying information and a second transmission-destination identifying information included in the header area of communication packet, the second transmission-destination identifying information which is used to identify the first communication terminal, when the communication packet is input via the external communication network; processing means for adding the first transmission-destination identifying information to communication a packet to be transmitted to the first communication terminal, when the first transmission-destination identifying information and the second transmission-destination identifying information coincide with each other, and adding the second transmission-destination identifying information to the communication packet, when the first transmission-destination identifying information and the second transmission-destination identifying information do not coincide with each other.

According to yet another aspect of the present invention, there is provided a communication method used in a communication system which includes a first communication terminal connected to an internal communication network having a communication channel used for transmission of a communication packet comprising a header area and a data area, a second communication terminal connected to an external communication network having the communication channel and arranged in an area which is larger than the internal communication network, and a connection device which connects the internal communication network and external communication network to each other, comprising: storing a first transmission-destination identifying information included the data area of communication packet transmitted from the first communication terminal, the first transmission-destination identifying information used in communication of the communication packet, when the communication channel to connect the first communication terminal and the second communication terminal is determined; comparing the first transmission-destination identifying information and a second transmission-destination identifying information included in the header area of communication packet, the second transmission-destination identifying information which is used to identify the first communication terminal, when the communication packet is input via the external communication network; adding the first transmission-destination identifying information to communication packet to be transmitted to the first communication terminal, when the first transmission-destination identifying information and the second transmission-destination identifying information coincide with each other, and adding the second transmission-destination identifying information to the communication packet, when the first transmission-destination identifying information and the second transmission-destination identifying information do not coincide with each other.

In an embodiment, an apparatus for processing a communication packet where the communication packet comprises a data area that comprises first transmission-destination identifying information associated with a first communication terminal, and a header area that comprises second transmission-destination identifying information associated with the first communication terminal, where the first transmission-destination identifying information is compared to the second transmission-destination identifying information when the communication packet is received from an external network.

In another embodiment, a communication device comprises a means for receiving a communication packet that comprises a data area and a header area, wherein the data area comprises first transmission-destination identifying information associated with a first communication terminal and where the header area comprises second transmission-destination identifying information associated with the first communication terminal, and a means for comparing the first transmission-destination identifying information and the second transmission-destination identifying information when the communication packet is received from an external network.

In yet another embodiment, a communication method comprises receiving a communication packet that comprises a data area and a header area, where the data area comprises first transmission-destination identifying information associated with a first communication terminal and where the header area comprises second transmission-destination identifying information associated with the first communication terminal, and comparing the first transmission-destination identifying information and the second transmission-destination identifying information when the communication packet is received from an external network.

Additional objects and advantages of the invention will be set forth in the description which follows, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the preferred embodiments given below, serve to explain the principles of the invention.

FIG. 7 is a block diagram showing the functional configuration of a telephone terminal connected to an IP network in the second embodiment.

DETAILED DESCRIPTION OF THE INVENTION

There will now be described embodiments of this invention with reference to the accompanying drawings.

(First Embodiment)

Figure 1:
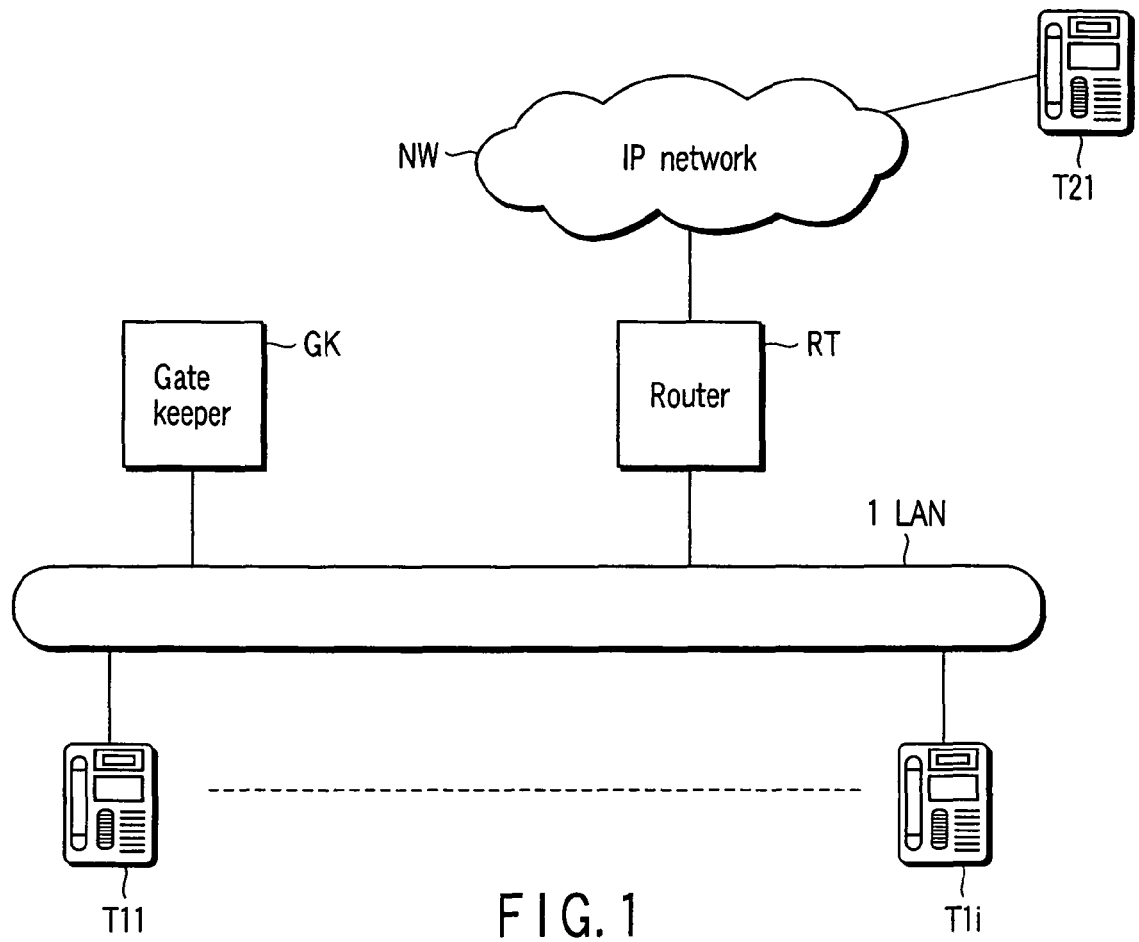
FIG. 1 is a schematic configuration view showing a communication system according to a first embodiment of this invention.

FIG. 1 is a schematic configuration view showing a communication system according to a first embodiment of this invention.

The system includes a Local Area Network (LAN) 1 as a private network. To the LAN 1, a plurality of telephone terminals T11 to T1i (i is a natural number) are connected. The telephone terminals T11 to T1i are IP telephone terminals each having a communication processing function and media information processing function. Further, the LAN 1 has a plurality of media channels and a control channel used to transmit a control signal necessary for selectively determining one of the media channels.

A router RT used as a connection device is connected to the LAN 1. The router RT has an address converting function and communication protocol between the LAN 1 and an IP network NW used as a global network.

Further, a gate keeper GK configured by a server is connected to the LAN 1. The gate keeper GK has an exchange control function for the plurality of telephone terminals T11 to T1i and router RT, an IP address allocation function for the plurality of telephone terminals T11 to T1i and router RT and a management function of managing addresses allocated to the plurality of telephone terminals T11 to T1i and router RT.

A telephone terminal T21 is connected to the IP network NW. The telephone terminal T21 is an IP telephone terminal having a communication processing function and media information processing function.

Figure 2:
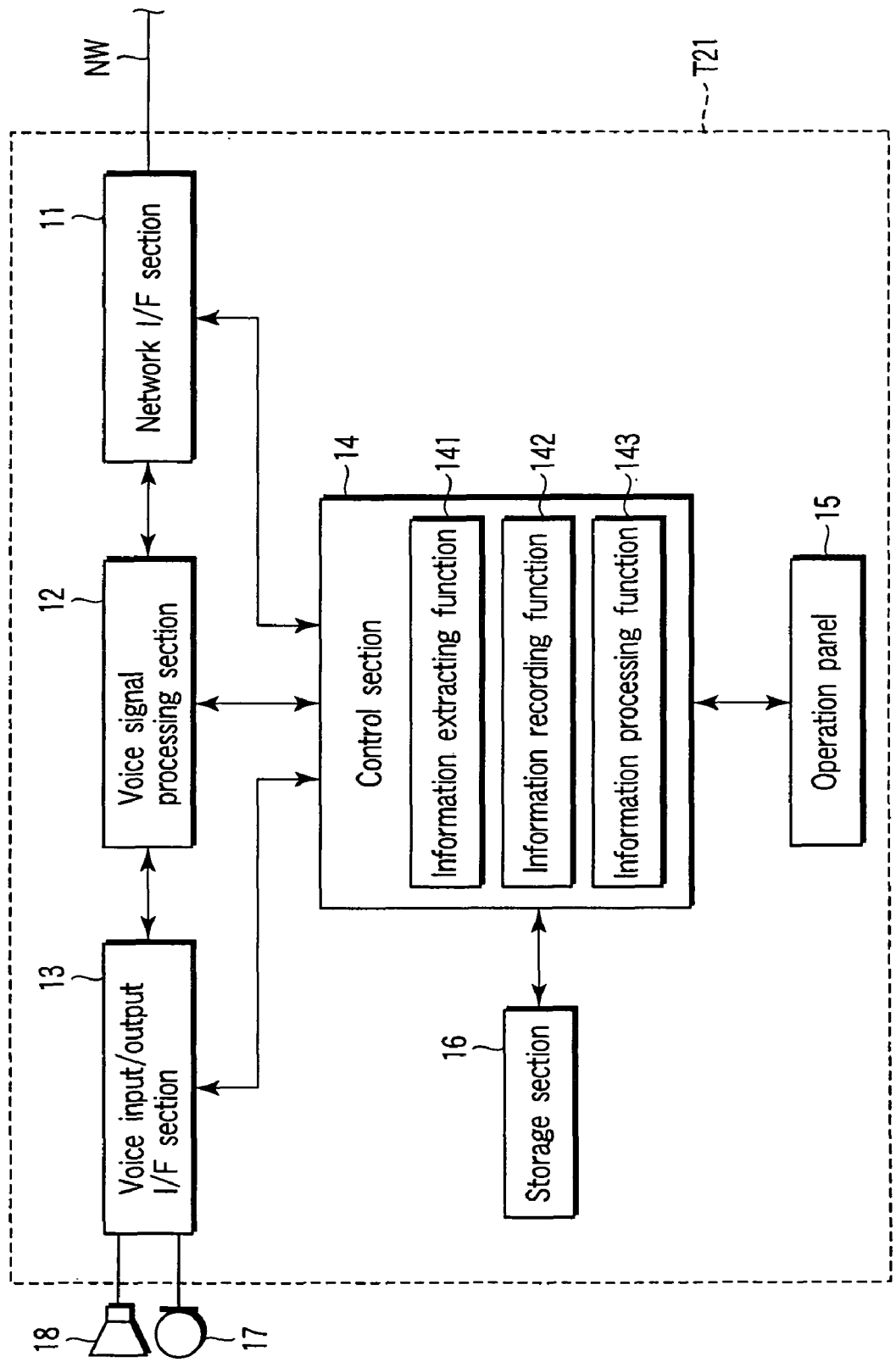
FIG. 2 is a block diagram showing the functional configuration of a telephone terminal connected to an IP network in the first embodiment.

The telephone terminal T21 is configured as follows. FIG. 2 is a block diagram showing the functional configuration of the telephone terminal T21.

The telephone terminal T21 includes a network interface section 11 (which is hereinafter referred to as a network I/F 11), voice signal processing section 12 (which is hereinafter referred to as a processing section 12), voice input/output interface section 13 (which is hereinafter referred to as an input/output I/F 13), control section 14, operation panel 15 and storage section 16.

The network I/F 11 performs the interface operation related to the IP network NW. That is, the network I/F 11 extracts a voice packet and control data from a transmitted packet transmitted from the IP network NW and respectively supplies the voice packet and control data to the processing section 12 and control section 14. Further, the network I/F 11 multiplexes data supplied from the control section 14 on the voice packet supplied from the processing section 12 and transmits the multiplexed data to the IP network NW.

The processing section 12 converts the voice packet supplied from the network I/F 11 into an analog reception voice signal and supplies the thus converted analog signal to the input/output I/F 13. Further, the processing section 12 converts a transmission voice signal input from the input/output I/F 13 into a voice packet which can be dealt with by the IP network NW and supplies the thus converted packet to the network I/F 11.

A microphone 17 and speaker 18 are connected to the input/output I/F 13. The input/output I/F 13 supplies a transmission voice signal input from the microphone 17 to the processing section 12, amplifies the reception voice signal output from the processing section 12 and outputs the amplified signal from the speaker 18.

The control section 14 performs the control operation for the respective sections of the telephone terminal T21 and performs the communication process with respect to the IP network NW by executing the software process.

The operation panel 15 has key switches, LCD and the like and receives various instructions input to the control section 14 by the user to notify various information items to the user.

The control section 14 has an information extracting function 141, information recording function 142 and information processing function 143. The information extracting function 141 extracts IP address and port number information of a transmission source added to a Real-time Transport Protocol (RTP) packet when the RTP packet is input via the IP network NW.

The information recording function 142 temporarily stores the extracted IP address and port number information of the transmission source in the storage section 16. The information processing function 143 adds the IP address and port number information on the storage section 16 to communication data to be transmitted to the transmission source and further adds an IP address and port number information of the self terminal and transmits the thus formed information to the communication channel of the IP network NW. At this time, whether or not the information items coincide with an IP address and port number information specified at the negotiation time is determined. If only the port number information items coincide with each other, the IP address and port number information of the transmission source attached to the RTP packet are utilized.

Each of the telephone terminals T11 to T1i has a function of adding IP address and port number information used to identify the self terminal and IP address and port number information used to identify the telephone terminal T21 to communication data to form and transmit a communication packet when a media channel which makes a connection to the telephone terminal T21 is determined.

Further, the router RT has a function of determining whether or not an RTP packet is a packet which is defined according to RFC1631 when the RTP packet is input after a media channel is set up between the LAN 1 and the IP network NW, adding the self IP address to the RTP packet according to the RFC1631 and transmitting the thus formed information to the transmission destination.

Figure 3:
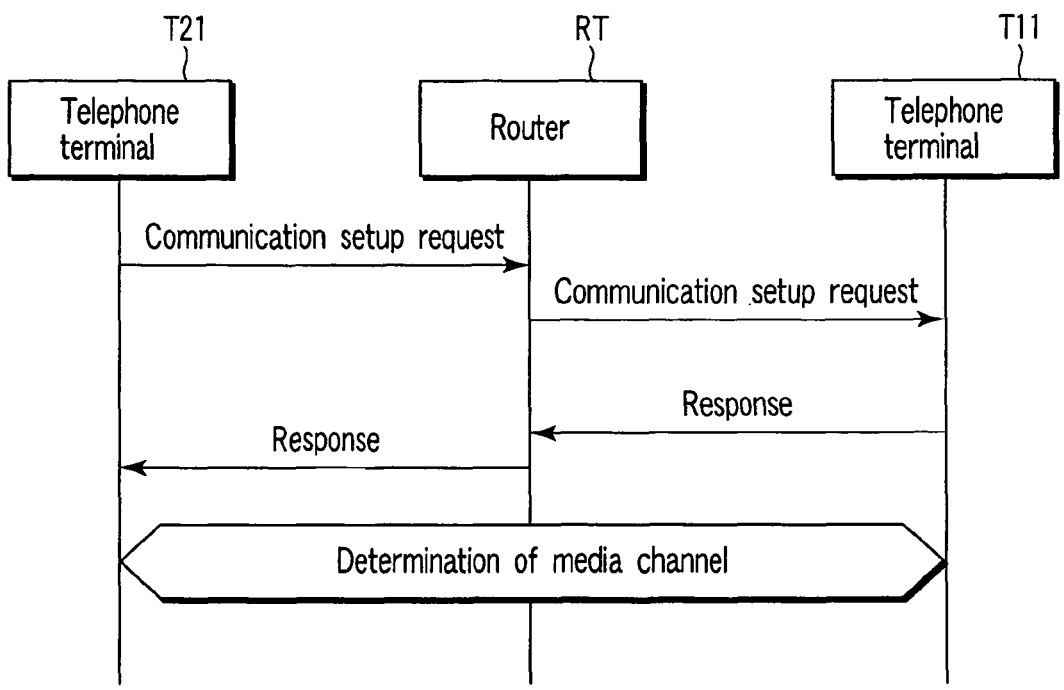
FIG. 3 is a sequence diagram showing negotiation when a media channel between a telephone terminal connected to a LAN, a telephone terminal connected to an IP network and a router is determined in the first embodiment.

Next, the operation of the apparatus with the above configuration is explained. FIG. 3 is a sequence diagram showing negotiation when a media channel between the telephone terminals T11 and T21 is determined, for example.

It is assumed that the user of the telephone terminal T21 connected to the IP network NW, for example, performs a calling operation with respect to the telephone terminal T11 in order to establish telephone communication with the telephone terminal T11 connected to the LAN 1. Then, a communication setup request signal (IP packet) is transmitted to the router RT from the telephone terminal T21 via a control channel on the IP network NW. In a header area of the communication setup request signal, the IP address and port number of the reception destination and the IP address and port number of the transmission source are contained. And In a data area of the communication setup request signal, the IP address and port number of the transmission source for a voice communication are contained.

The router RT which has received the communication setup request signal transfers the communication setup request signal to the gate keeper GK, refers to routing information in the gate keeper GK and transmits the communication setup request signal to the telephone terminal T11 corresponding to the reception destination via the LAN 1.

In the telephone terminal T11 which has received the communication setup request signal, ringing is issued or a reception display is made. Thus, occurrence of an incoming call is notified to the user. Then, if the user performs a response operation in response to the notification of the incoming call, the telephone terminal T11 transmits a response signal to the router RT. In a header area of the response signal (IP packet), the IP address and port number of the reception destination and the IP address and port number of the transmission source are contained. And in a data area of the response signal, the IP address and port number of the transmission source for voice communication are contained. The router RT which has received the response signal converts the IP address and the port number of the transmission source included in the header area of the response signal into the router self IP address and port number (for the global network), and transmits a response signal to the IP network NW. At this time, the telephone terminal T21 stores the P address and port number included in the data area of the response signal into the storage section 16.

Thus, a communication path, that is, media channel is determined between the telephone terminal T21 of the transmission source and the telephone terminal T11 of the reception destination. After this, a voice communication can be established and maintained between the telephone terminals T11 and T21.

At this time, assume that a voice of the user is input to the telephone terminal T11. Then, as shown in FIG. 4(a), the telephone terminal T11 transmits an RTP packet obtained by adding an IP address and port number of the transmission destination and an IP address and port number of the transmission source to the header area to the router RT.

The router RT converts the IP address and the port number of the transmission source included in the header area of the input RTP packet into an IP address and a port number assigned to the router RT and recognized by the IP network NW based on RFC1631. Then, as shown in FIG. 4(b), the router RT transmits the thus formed data to the telephone terminal T21. In the telephone terminal T21, when the control section 14 fetches the RTP packet (step ST5a), it extracts the IP address information and port number information of the transmission source included the header area the RTP packet (step ST5b) and stores the thus extracted information into the storage section 16 (step ST5c).

Figure 5:
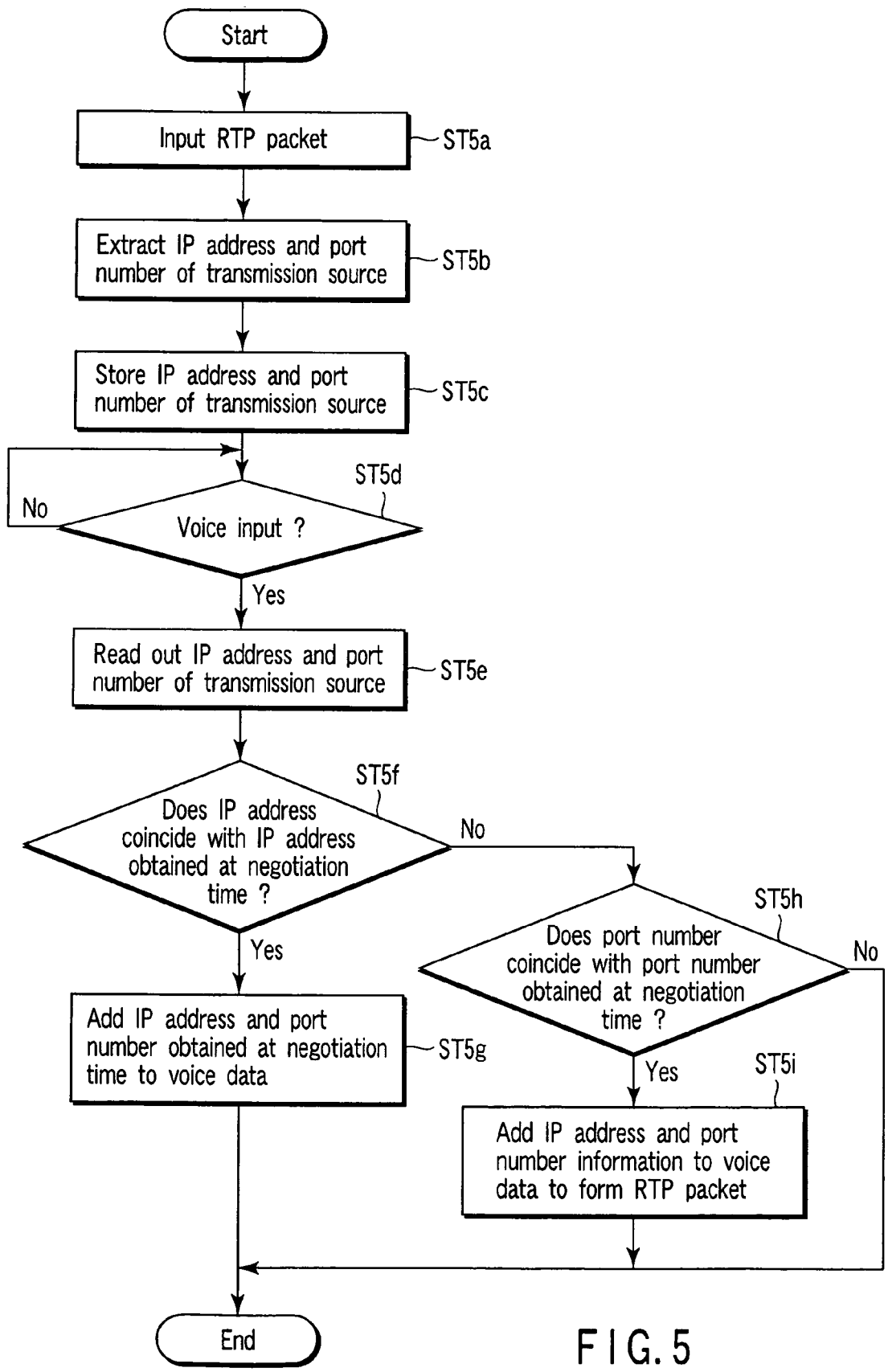
FIG. 5 is a flowchart for illustrating a processing procedure of a telephone terminal connected to the IP network in the first embodiment.

When the RTP packet arrives from the IP network NW, the telephone terminal T21 starts the processing procedure shown in FIG. 5.

In the telephone terminal T21, when the control section 14 fetches the RTP packet (step ST5a), it extracts the IP address information and port number information of the transmission source included the header area the RTP packet (step ST5b) and stores the thus extracted information into the storage section 16 (step ST5c).

Then, the control section 14 determines whether or not a voice is input to the microphone 17 (step ST5d). If a voice is input (Yes), the control section 14 reads out the IP address information and port number information of the transmission source from the storage section 16 (step ST5e) and determines whether or not the IP address coincides with an IP address obtained at the negotiation time and stored in the storage section 16 (step ST5f).

If the IP addresses coincide with each other (Yes), the control section 14 adds the IP address and port number information specified at the negotiation time to voice data to form an RTP packet (step ST5g) and transmits the RTP package to the media channel of the IP network NW.

If the IP addresses do not coincide with each other (No), the control section determines whether or not the port number information coincides with the port number information obtained at the negotiation time (step ST5h). At this time, if the port number information items coincide with each other (Yes), the control section 14 adds the IP address and port number information of the transmission source included in the header area of the transmitted RTP packet to voice data to form an RTP packet (step ST5i) and transmits the RTP packet to the media channel of the IP network NW.

If the port numbers do not coincide with each other, the control section 14 informs the transmission source to the effect that the packet does not meet the requirement or an error occurs.

Thus, as shown in FIG. 4(c), the RTP packet transmitted from the telephone terminal T21 is subjected to conversion of the IP address and port number of the transmission destination into an IP address and port number used by LAN 1 in the router RT and the RTP packet reaches the telephone terminal T11.

In the telephone terminal T21, the contents of the RTP packet are checked in the step ST5a and if the packet does not meet the requirement, the packet may be discarded.

As described above, in the first embodiment, when communication is performed between the telephone terminals T11 and T21, the IP address and port number information of the transmission source added to the header area of the RTP packet are extracted in the telephone terminal T21 which has received the RTP packet, and then the IP address and port number information are added to an RTP packet and transmitted to the telephone terminal T11.

Therefore, it is not necessary to provide a special function on the router RT and acquire special information from the router RT and it is possible to make telephone conversation between the telephone terminals T11 and T21.

Thus, since modification of the router RT itself is made unnecessary, the cost of the whole system can be kept low and the processing load of the router RT can be reduced.

In the telephone terminal T21, when the IP address specified by the data area of the communication setup request signal or the response signal at the negotiation time coincides with the IP address of the RTP packet which has arrived, the RTP packet is returned to the telephone terminal T11 by recognizing that the transmission-destination is not a terminal on the private network via a router that provides the NAT function, and by use of the IP address and port number information specified by the data area of the communication setup request signal or the response signal at the negotiation time. Therefore, erroneous communication or dishonest communication can be prevented from being performed between the telephone terminals T11 and T21. At this time, the port numbers may be different form each other.

In the first embodiment, a function of interrupting transmission of the RTP packet to be transmitted to the telephone terminal T21 until the RTP packet from the telephone terminal T21 is received can be provided for the telephone terminals T11 to T1i. In this case, a telephone conversation between the telephone terminals T11 and T21 can be efficiently performed by cooperatively operating the telephone terminals T11 and T21 by taking into consideration time required for extracting the IP address and port number information of the transmission source in the telephone terminal T21. As a result, when one media channel is commonly used between the telephone terminals T11, T21, the effective utilization factor thereof can be enhanced.

(Second Embodiment)

Figures 4, 6:
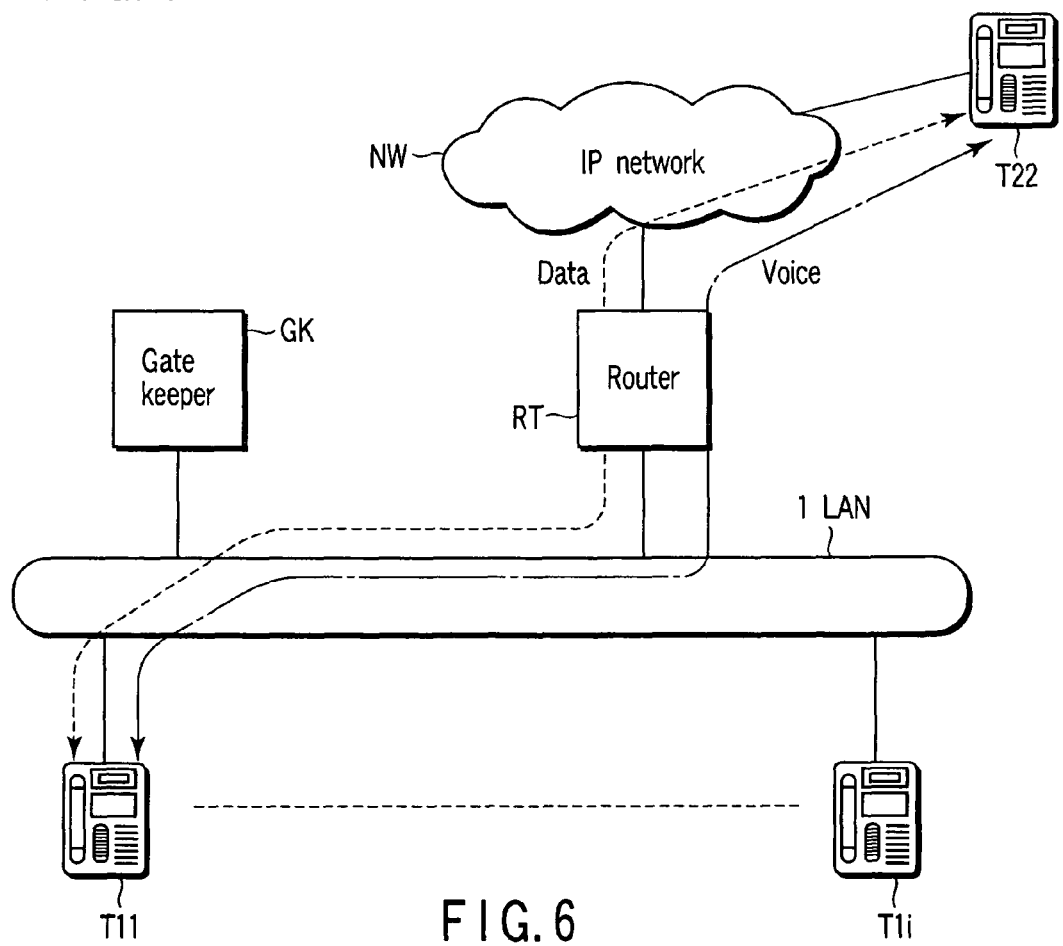
FIG. 4 is a diagram showing a foimat of an RTP packet executed between a telephone terminal connected to the LAN and a telephone terminal connected to the IP network in the first embodiment.
FIG. 6 is a schematic configuration view showing a communication system according to a second embodiment of this invention.

FIG. 6 is a schematic configuration view showing a communication system according to a second embodiment of this invention. In FIG. 6, portions which are the same as those shown in FIG. 1 are denoted by the same reference symbols and the detail explanation thereof is omitted.

In the system, for example, it is assumed that a telephone terminal T11 and a telephone terminal T22 connected to an IP network NW are connected to each other via a voice channel and data channel. In this case, a telephone conversation is made between the telephone terminals T11 and T22 and communication for a data packet such as image data and character data is also performed.

The telephone terminal T22 is configured as follows. FIG. 7 is a block diagram showing the functional configuration of the telephone terminal T22. In FIG. 7, portions which are the same as those of FIG. 2 are denoted by the same reference symbols and the detail explanation thereof is omitted.

That is, a channel determination function 144 is provided in a control section 14. When the telephone terminal T22 is connected to the telephone terminal T11 via the voice channel and data channel, the channel determination function 144 determines a channel to which an RTP packet arrives and causes an information extracting function 141, information recording function 142 and information processing function 143 to be performed in parallel for each channel.

Thus, according to the second embodiment, when communication for a voice packet and data packet is performed between the telephone terminals T11 and T22, transfer of the voice packet and transfer of the data packet can be independently controlled in parallel. Thus, transfer of the voice packet and transfer of the data packet can be stably performed without mutually giving influences.

(Other Embodiments)

This invention is not limited to the above embodiments.

Further, in the first embodiment, an example in which the voice communication is performed is explained, but this invention can be applied to data communication.

Further, in the above embodiments, the telephone terminal is explained as an example, but a personal computer or server having a telephone function can be used, for example.

In the above embodiments, the system comprising the IP network and LAN having the plurality of media channels and control channels is explained. However, this invention can be applied to a system comprising an IP network and LAN having only media channels.

In addition, the configuration and type of the system, the configuration of the telephone terminal, the types of identification information and communication packet, the type of a control signal used for negotiation, the process of the negotiation and the returning process of the communication packet can be variously modified without departing from the technical scope of this invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication system comprising:
a first communication terminal connected to an internal communication network including a communication channel used for transmission of communication packets that comprise a data area and a header area, the data area comprising an Internet Protocol (IP) address and a port number of a transmission source, the header area comprising an IP address and a port number of a transmission source and a transmission destination;
a second communication terminal connected to an external communication network including the communication channel and arranged in an area which is larger than the internal communication network; and
a connection device configured to connect the internal communication network and external communication network to each other, and to convert the IP address of the transmission source included in the header area into an IP address used on the external communication network when the communication packets are received from the internal communication network, and to convert the IP address of the transmission source included in the header area into an IP address used on the internal communication network when the communication packets are received from the external communication network;
wherein the second communication terminal includes:
a memory configured to store an IP address and a port number included in a data area of a control signal transmitted from the first communication terminal, when the communication channel to connect the first communication terminal and the second communication terminal is determined;
a comparing module configured to compare the IP address stored in the memory with the IP address included in the header area when a first communication packet is input via the external communication network, and to further compare the port number stored in the memory with the port number included in the header area of the first communication packet if the IP address stored in the memory does not coincide with the IP address included in the header area of the first communication packet; and
a processor configured to add the IP address and port number stored in the memory to a second communication packet to be transmitted to the first communication terminal if the IP address stored in the memory and the IP address included in the header area of the first communication packet coincide with each other, and to add the IP address included in the header area of the first communication packet to the second communication packet if the IP address stored in the memory and the IP address included in the header area of the first communication packet do not coincide with each other but the port number included in the header area of the first communication packet and the port number stored in the memory do coincide with each other.

2. The communication system of claim 1, wherein the first communication terminal interrupts transmission of the first communication packet to be transmitted to the second communication terminal until a third communication packet from the second communication terminal is received.

3. The communication system of claim 1, wherein the processor forms the second communication packet to be transmitted to the first communication terminal based on the transmission/reception result of a control signal required for determining the communication channel which connects the first and second communication terminals to each other, and transmits the second communication packet to the external communication network when the internal communication network and external communication network include a control channel to transmit the control signal.

4. The communication system of claim 1, wherein the first and second communication terminals are connected to the internal communication network and external communication network via at least two communication channels.

5. The communication system of claim 1, wherein the first and second communication packets are one of a voice packet and data packet.

6. A communication terminal device used as a second communication terminal of a communication system which includes a first communication terminal connected to an internal communication network including a communication channel used for transmission of communication packets that comprise a data area and a header area, the data area comprising an Internet Protocol (IP) address of a transmission source, the header area comprising an IP address of a transmission source and a transmission destination, the second communication terminal being connected to an external communication network including the communication channel and arranged in an area which is larger than the internal communication network, and a connection device which connects the internal communication network and external communication network to each other, the connection device being configured to convert the IP address of the transmission source included in the header area into an IP address used on the external communication network when the communication packets are received from the internal communication network, and to convert the IP address of the transmission source included in the header area into an IP address used on the internal communication network when the communication packets are received from the external communication network, the second communication terminal comprising:
    a memory configured to store an IP address and a port number included in a data area of a control signal transmitted from the first communication terminal, when the communication channel to connect the first communication terminal and the second communication terminal is determined;
    a comparing module configured to compare the IP address stored in the memory with the IP address included in the header area when a first communication packet is input via the external communication network, and to further compare the port number stored in the memory with the port number included in the header area of the first communication packet if the IP address stored in the memory does not coincide with the IP address included in the header area of the first communication packet; and
    a processor configured to add the IP address and port number stored in the memory to a second communication packet to be transmitted to the first communication terminal if the IP address stored in the memory and the IP address included in the header area of the first communication packet coincide with each other, and to add the IP address included in the header area of the first communication packet to the second communication packet if the IP address stored in the memory and the IP address included in the header area of the first communication packet do not coincide with each other but the port number included in the header area of the first communication packet and the port number stored in the memory do coincide with each other.

7. A communication method used in a communication system which includes a first communication terminal connected to an internal communication network including a communication channel used for transmission of communication packets that comprise a data area and a header area, the data area comprising an Internet Protocol (IP) address and a port number of a transmission source, the header area comprising an IP address and a port number of a transmission source and a transmission destination, a second communication terminal connected to an external communication network including the communication channel and arranged in an area which is larger than the internal communication network, and a connection device which connects the internal communication network and external communication network to each other, the connection device being configured to convert the IP address of the transmission source included in the header area into an IP address used on the external communication network when the communication packets are received from the internal communication network, and to convert the IP address of the transmission source included in the header area into an IP address used on the internal communication network when the communication packets are received from the external communication network, the method comprising:
    storing an IP address and a port number included in a data area of a control signal transmitted from the first communication terminal in a memory, when the communication channel to connect the first communication channel and the second communication terminal is determined;
    comparing the IP address stored in the memory with the IP address included in the header area when a first communication packet is received from the first communication terminal, and further comparing the port number stored in the memory with the port number included in the header area of the first communication packet if the IP address stored in the memory does not coincide with the IP address included in the header area of the first communication packet; and
    adding the IP address and port number stored in the memory to a second communication packet to be transmitted to the first communication terminal if the IP address stored in the memory and the IP address included in the header area of the first communication packet coincide with each other, and adding the IP address included in the header area of the first communication packet to the second communication packet if the IP address stored in the memory and the IP address included in the header area of the first communication packet do not coincide with each other but the port number included in the header area of the first communication packet and the port number stored in the memory do coincide with each other.

8. The communication terminal device of claim 6, wherein the processor is configured to form the second communication packet to be transmitted to the first communication terminal based on the transmission/reception result of a control signal required for determining a communication channel which connects the first and second communication terminals to each other, and to transmit the second communication packet to the external communication network when the internal communication network and external communication network include a control channel to transmit the control signal.

9. The communication terminal device of claim 6, wherein the communication terminal device is connected to the internal communication network and external communication network via at least two communication channels.

10. The communication terminal device of claim 6, wherein the first and second communication packets are one of a voice packet and data packet.

11. The communication method of claim 7, wherein the first communication terminal interrupts transmission of the first communication packet to be transmitted to the second communication terminal until a third communication packet from the second communication terminal is received.

12. The communication method of claim 7, further comprising forming the second communication packet to be transmitted to the first communication terminal based on the transmission/reception result of a control signal required for determining a communication channel which connects the first and second communication terminals to each other, and transmitting the second communication packet to the external communication network when the internal communication network and external communication network include a control channel to transmit the control signal.

13. The communication method of claim 7, wherein the first and second communication terminals are connected to the internal communication network and external communication network via at least two communication channels.

14. The communication method of claim 7, wherein the first and second communication packets are one of a voice packet and data packet.

* * * * *